March 3, 1936.　　　　B. C. PLACE　　　　2,032,499
ATTACHING SNAP FASTENER
Filed June 16, 1930
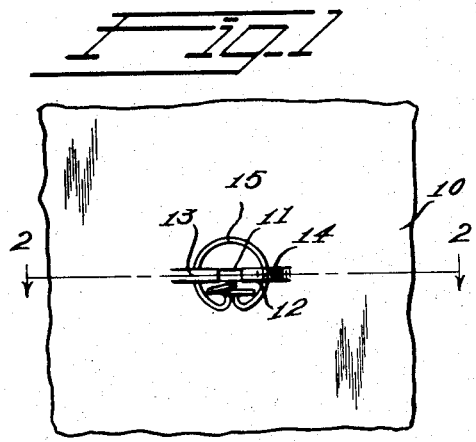
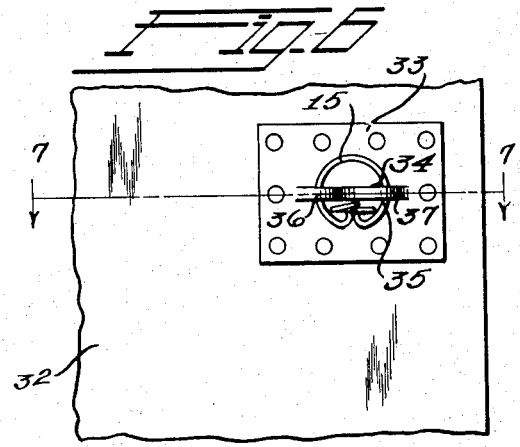
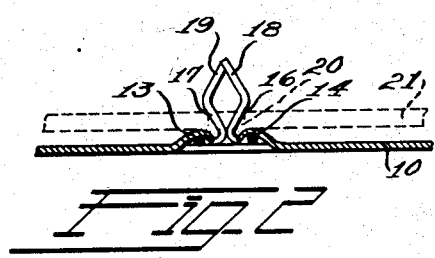
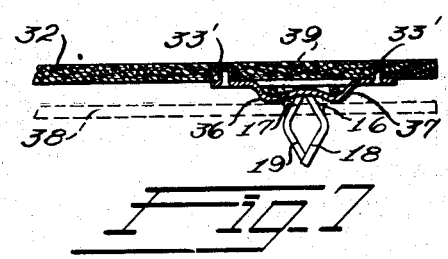
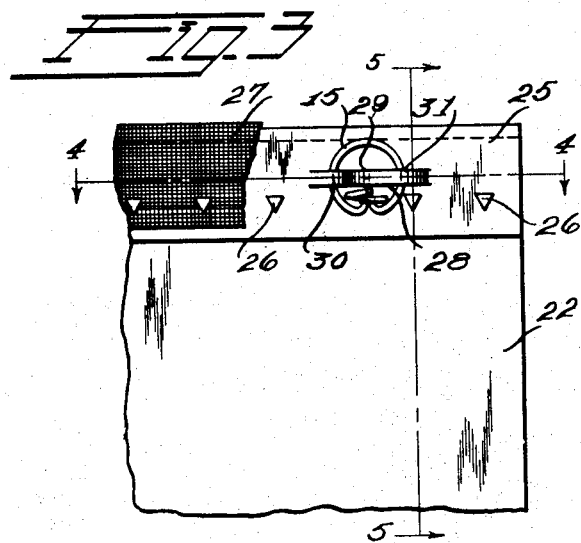
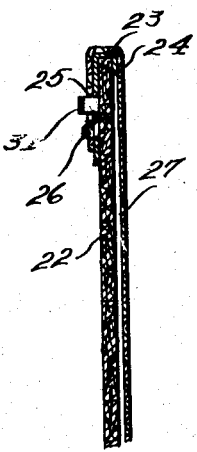
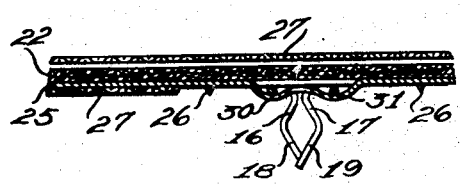
Inventor
Bion C. Place

UNITED STATES PATENT OFFICE 2,032,499

ATTACHING SNAP FASTENER

Bion C. Place, Detroit, Mich., assignor of one-half to George E. Gagnier, Detroit, Mich.

Application June 16, 1930, Serial No. 461,527

2 Claims. (Cl. 24—208)

This invention relates to a novel method and arrangement, whereby snap fasteners may be anchored with respect to a metallic element of sheet-like form, which method and arrangement may be utilized to position the head of the fastener against one face of the metallic element by utilizing a relatively small portion of said metallic element as a means to hold the snap fastener in position so that it is held from movement away from the element by said means and from movement toward the element by contacting with the body thereof.

In many situations it is desirable to utilize snap fasteners to secure metallic elements together by simply attaching the snap fasteners to one of said elements, and by causing their holding portions to snap into sockets or openings provided in the other of said elements. In some instances, it is desirable to attach the snap fasteners to the metallic elements in a manner permitting each fastener to shift laterally with respect to the metallic element, so that the holding portion of the fastener may readily be brought opposite the socket or opening provided in the supporting structure to receive it without regard to whether said socket or opening is exactly opposite said holding portion. Such arrangement is desirable in attaching trim panels to the interior of metallic automobile or similar bodies, for example, and various relatively complex arrangements have been provided to accomplish this result. This invention aims to simplify existing arrangements and to utilize a portion of the sheet metal element itself as the means to attach the snap fastener thereto. The use of extraneous fastening means is accordingly avoided, resulting in a construction that may be produced at a very low cost.

The primary object of the invention accordingly is to provide a novel method and arrangement for attaching a headed snap fastener to a metallic element of sheet like or similar form by separating a portion of said element from the body thereof, and utilizing the separated portion to secure the head of the fastener to the element in a manner so that the head is disposed between the separating portion and the body of the element.

A further object of the invention is to provide a method and arrangement for anchoring snap fasteners to a metallic element, that may at the same time serve the further purpose of reinforcing the edge of a trim panel, such as, for example, the trim panel of an automobile body, which reinforcement may also at the same time serve the still further purpose of attaching the fabric covering frequently employed for such panels to the reinforcement.

A still further object of the invention is to provide a simple way of attaching a headed fastener to sheet metal without extraneous fasteners and in a way permitting the fastener to shift laterally slightly in any direction.

Still further objects of the invention will appear as a description thereof proceeds with reference to the accompanying drawing in which, Figure 1 is a fragmentary plan view of a metallic element with a snap fastener of preferred form assembled with respect thereto in accordance with this invention.

Figure 2 is a sectional view taken on the plane indicated by the line 2—2 Figure 1 showing in dotted lines a perforated supporting structure to which the metallic element may be applied.

Figure 3 is a fragmentary rear view of an automobile trim panel showing the invention applied in attaching a snap fastener to a metallic edge reinforcement for such a panel.

Figure 4 is a sectional view taken on the plane indicated by the line 4—4 in Figure 3.

Figure 5 is a further sectional view taken on the plane indicated by the line 5—5 of Figure 3.

Figure 6 is a fragmentary view of a further modification of the invention showing how the invention may be applied to secure a snap fastener to a metallic tab that is rigidly connected to a fibrous or similar automobile trim panel.

Figure 7 is a sectional view taken on the plane indicated by a line 7—7 in Figure 6.

Like reference characters indicate like parts throughout the several figures.

Referring to Figures 1 and 2, the numeral 10 designates a fragment of a metal sheet or element that is to be secured to a supporting structure by means of a snap fastener. In order to facilitate the attachment of said metallic element to the supporting structure it is desirable to secure the snap fasteners at spaced intervals to the rear of the metallic element, so that the element may readily be secured to the supporting structure by causing the snap fasteners, secured to the rear thereof, to enter sockets or openings in the supporting structure of whatever nature.

In order that a snap fastener may be anchored with respect to the metallic element 10, preferably, the metallic element is slit on parallel lines designated by the numerals 11 and 12, to separate a narrow band of metal from the body thereof. This band is utilized as the means to attach the head of the headed snap fastener to the metallic element. To accomplish this the band thus formed is bent out of the plane of the body of the metallic element, so that it is spaced substantially inwardly of the inner face of said element. If desired, the band may be separated between the points to which it is attached to the sheet metal element to thus provide a pair of tongues designated by the numerals 13 and 14. Said tongues are utilized for the purpose of being interlocked with the head of the headed snap fastener in a manner hereinafter described.

The snap fastener that is utilized to secure the metallic elements to the supporting structure may assume various forms. I have illustrated the snap fastener that is disclosed in my Patent #1,679,266 granted July 31st, 1928, although any other form of headed snap fastener may be used. As described in the patent just referred to, the preferred snap fastener is constructed by bending a single piece of spring wire to form a fastener having a head and a shank projecting at right angles to said head, the shank of the fastener comprising a pair of legs that may be bent so as to bring them closer together to permit the insertion of the shank of the fastener in the socket or opening designed to receive it, and that will spring apart to engage the edges of said socket or opening when the fastener is in its holding position. In detail, the fastener is formed by bending the mid portion of the wire into the form of a loop 15. The ends are then brought together in the plane of the loop toward the center thereof, and then bent at right angles to the plane of the head, said ends being first bent divergently to form holding portions 16 and 17, after which the ends of the wire are bent convergently to form guiding portions 18 and 19.

The fastener just described is assembled with respect to the metallic element above referred to by first bending the tongues into the form shown in Figure 2, and then inserting the loop constituting the head of the fastener laterally beneath said tongues. The inherent resilience of the tongues permits the loop constituting the head to snap past said prongs. Or, if desired, the tongues may be bent away from the body of the metallic element sufficiently to permit the head of the fastener to be freely slid between the tongues after which they can be bent around the head so as to interlock the head of the fastener and the metallic element by means of said tongues. It will be observed that the arrangement disclosed permits the fastener to shift bodily laterally slightly, in the form of invention illustrated. This is desirable in many situations in which the socket or opening, provided to receive the shank of the fastener, is not precisely in alignment with the shank of said fastener. Said fastener is accordingly free to shift slightly laterally so that the head of the fastener may lie flat against the inside of the body of the supporting element, and so that the shank thereof projects truly at right angles to said body after the assembly has been completed.

In the use of the invention so far described, the metallic element with the fastener attached thereto as described is brought into position opposite the opening 20 in a supporting structure 21, illustrated in dotted lines in Figure 2. A pressure is then exerted against the supporting element which serves to force the shank of the fastener through the opening 20, the diverging portions constituting a part of the shank of the fastener being first sprung together to permit the shank of the fastener to pass through the opening. After the fastener has been applied completely the said diverging portions spring apart causing the metallic element to be yieldingly drawn toward the supporting structure, by virtue of the resilience in the divergently disposed legs. In inserting the fastener through the opening the converging portions 18 and 19 serve, of course, to guide the widest portion of the fastener through said opening in a manner more fully described in my patent above referred to.

In the form of the invention shown in Figures 3, 4, and 5, a snap fastener is anchored with respect to a metallic element, which, in this instance, serves as a metallic edge constituting a reinforcing for the edges of the panel used for finishing the interior of an automobile or similar body. The body of such a panel is designated by 22. Said body may be constructed of metal-reinforced fiber board, fibre board or any suitable material. The edges of said fiber board are preferably reinforced by means of a sheet metal edging 23 lapping the edge of said body and extending only a relatively short distance, as shown at 24, around the front face of the body. The edging 23 is provided, however, with a relatively wide or skirt portion 25 lapping the rear of the body 22. At intervals along the length of skirt 25 prongs 26 are struck therefrom, by severing a relatively small portion of said metallic element from the body thereof on two sides, and by bending said prongs out of the plane of said body, so that said prongs may serve the purpose of securing a fabric covering 27 to the face of the panel, which covering extends around the rear edge of the body in lapped relation to the edging and so as to be engaged by said prongs 26 and held in position thereby. The arrangement so far described is disclosed in my Patent #1,889,903 dated December 6, 1932. The metal edge reinforcement serves the purpose of strengthening the edges of the body of the panel and, by virtue of the integral prongs 26 struck therefrom, also serves as a unitary means permitting ready attachment of the fabric covering 27 to the metal reinforcement.

The snap fasteners used to attach the panel to the supporting structure are secured to the metallic reinforcement by slitting said reinforcement on the lines designated by the numerals 28 and 29, and by bending the band of metal thus separated from the body of the material into sinuous form preferably, including two corrugations 30 and 31 extending away from the body of the metal reinforcement. Preferably the prongs 26 as well as the band provided by the slits 28 and 29 are all struck and bent from the sheet of metal at a single stamping operation, so that the metallic reinforcing strip is provided with the fastener holding means as well as the fabric retaining prongs in one operation, and before the strip is applied to the edge of the body of the panel. After the metal reinforcement is applied to the edge of the body of the panel and the fabric has been applied to the covering and has been lapped around the reinforcement and secured in position by engagement with the prongs 26, the snap fasteners are loosely anchored with respect to said metal reinforcement by inserting the loop 15 beneath the band provided by the slits 28 and 29. The inherent resilience of the metal constituting said band will permit said loop to be snapped beneath the band so that the portion of the band between the corrugations 30 and 31 engages in the loop, serving to prevent the ready lateral withdrawal of the fastener from engagement with the metal reinforcement. It will be understood that the fabric is cut away adjacent the points of application of the fastener to the metal edges, which fasteners are applied at regularly spaced intervals along the edges of the panels.

The panel with the fastener attached thereto in the manner just described is applied to the interior of the automobile and similar bodies by bringing the fasteners, that are anchored with respect thereto, opposite openings in the supporting structure of the body provided to receive the shank of the fastener. The panel is applied by simply exerting a pressure in the direction along the length of the shank of the fastener and causing said fastener to snap into the sockets or openings provided in the supporting structure in the manner above described with reference to the form of invention shown in Figures 1 and 2 and as also described in my copending application just referred to.

A still further modification of the invention is shown in Figures 6 and 7 of the drawing in which the numeral 32 represents an imperforate finishing panel of any kind for use in the upholstering of the interior of an automobile body, for example. Said panel may be constructed of fiber board, or steel reinforced fiber board, and the exposed surface thereof may be ornamented in any manner or covered with a fabric that may be cemented or otherwise applied to the panel 32. This invention contemplates the application of snap fasteners to the panel 32 without perforating the exposed surface of the panel. This is effected by attaching metal tabs 33 to the inside of the panel by striking tongues 33' from the body of the tabs at substantially equally spaced intervals thereof around the periphery of the tab. Such tabs 33 are inserted in the fibrous material constituting the body of the panel 32, as illustrated in Figure 7. The mid-portion of the tab is slit on parallel lines, indicated by 34 and 35, to form a band which is corrugated to provide portions 36 and 37 disposed in spaced relation to the adjacent portion of the body of the tab 33.

The head 15 of the snap fastener is inserted beneath the band provided by the slits 34 and 35 in the central portion of said tab in the manner above described with reference to the modification shown in Figures 3, 4 and 5 of the drawing. It will be readily understood that the band to secure the fastener to the panel may be struck therefrom in a single punching operation that at the same time accomplishes the striking of the tongues and that likewise the corrugating of the band may also be effected by the same operation, so that tabs of proper form for ready attachment to the panel and for the ready attachment of the snap fasteners may be provided by a single stamping operation.

The tabs are applied to the panel by causing the tongues 33' thereof to bite into the fiber of the panel without penetrating to the front face thereof, and thus marring the appearance of said face, which is the exposed surface of the panel in actual use.

The fastener is assembled by inserting the head 15 beneath the band formed by the slits 34 and 35 causing the body thereof to be bent upwardly sufficiently to permit the head of the fastener to pass therebeneath holding the fastener in position with a capability of relatively slight lateral movement if preferred.

It should be understood that the loop constituting the head of the snap fastener may be small enough, and the band formed by the parallel slits may be so proportioned, that the fastener is incapable of any lateral movement, if this is desired.

The panel provided with the fasteners is attached to a supporting structure 38 indicated in dotted lines in Figure 7, by simply bringing the shank of the snap fastener opposite the opening 39 provided in said structure, and forcing the fastener through said opening, first, contracting it to permit its passage and subsequently permitting its expansion to engage the edges of the opening with a wedging action tending to draw the panels firmly in position against said supporting structure, in the manner above described with reference to Figures 1 and 2.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In combination, a sheet metal body element having a rectangular portion of the body disposed in offset relation with respect to the body; said portion having a sinuous part, and a snap fastener having a head provided with a recess and inserted between said portion and body, the headed fastener being interlocked with the sheet metal element when the sinuous part of said portion is within said recess.

2. In combination, a sheet metal body element having a portion of the body thereof disposed in offset relation with respect to said body, a headed snap fastener having a head substantially wider than said offset portion and an expansible and contractible shank extending away from said head adjacent an edge of the head, said head being disposed between said offset portion and the body of the sheet metal element adjacent thereto, and means formed as a part of said element and engaging a recess in the head of the fastener to prevent ready lateral disengagement of the fastener.

BION C. PLACE.